United States Patent Office 3,403,185
Patented Sept. 24, 1968

3,403,185
METHOD OF PRODUCING NITRO-BIPHENYLS AND NITRO-TERPHENYLS
John Martin Nilsson, Solna, and James Axel Christer Björklund, Stockholm, Sweden, assignors to Aktiebolaget Bofors, Bofors, Sweden, a corporation of Sweden
No Drawing. Filed Nov. 30, 1966, Ser. No. 597,845
Claims priority, application Sweden, Dec. 9, 1965, 15,951/65
7 Claims. (Cl. 260—612)

Biphenyls have generally been produced by means of the so-called Ullman biaryl synthesis (1). This is primarily suitable for producing symmetrical biphenyls.

(1)

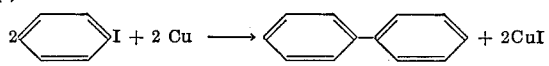

The metallic copper acts as a reactant to combine with the halogen (iodine) atoms as the rings are joined to form biphenyl.

In attempts to produce unsymmetrical biphenyls, mixtures of symmetrical and unsymmetrical biphenyls are obtained, in varying proportions, e.g.:

(2)

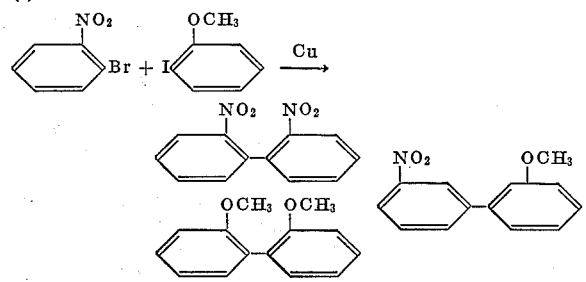

This results in not only low yields of unsymmetrical biphenyls, but difficulties in isolating them, as the different biphenyls often have similar physical properties.

The present invention relates to a novel method which can be applied with a good yield to produce unsymmetrical biphenyls, with formation of only negligible quantities of symmetrical biphenyls during the reaction, and during which reaction the production of terphenyls may also be accomplished. In particular, the novel method of this invention is useful in preparing nitro-biphenyls and nitro-terphenyls. This novel method is based upon the use of copper (I) oxide instead of metallic copper for the reaction, and comprises heating aromatic activated halogen compounds, e.g., iodine compounds, with aromatic nitro compounds and copper (I) oxide, in the presence of a solvent such as quinoline to form desired unsymmetrical biphenyls.

In the present invention, the high reactivity of aromatic nitro compounds is utilized. 2-nitro-benzoic acid, when heated with copper (I) oxide in suitable solvent, produces a rapid evolution of carbon dioxide and the formation of nitro-benzene. If aromatic iodine compounds or other reactive aromatic halogen compounds are present, these react rapidly with the decomposing 2-nitro-benzoic acid, to form unsymmetrical biphenyls according to Reaction Scheme 3 below. Only negligible quantities of symmetrical biphenyls are then formed. In the reaction, anhydrides of the acids can also be used, although this does not result in any further advantage.

(3)

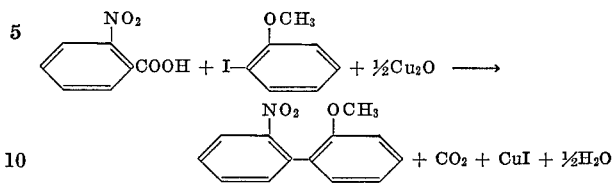

(4)

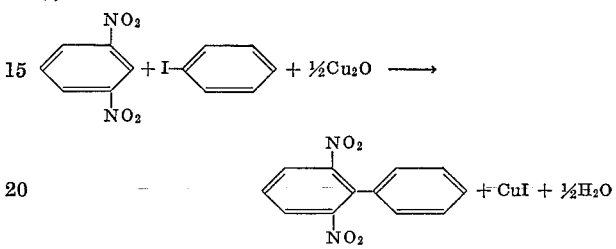

Aromatic nitrocompounds, particularly 1,3-dinitro-benzene and its derivatives, react in the same way to give biphenyls according to foregoing Reaction Scheme 4.

Compounds such as 1,3,5-trinitro-benzene can be allowed to react with 2 mols of the aromatic halogen compound to give m-terphenyls (Reaction Scheme 5).

(5)

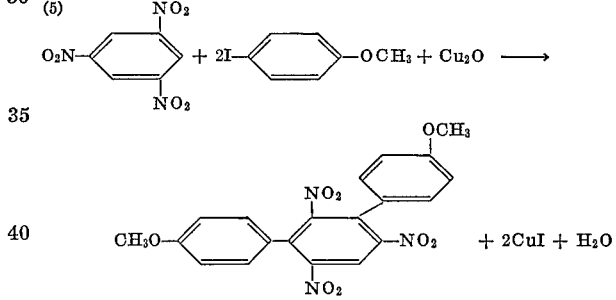

The aromatic iodine compounds may be unsubstituted or may contain such substituents as alkoxy, nitro and halogens. Instead of iodine compounds, activated aromatic halogen compounds such as 1-chloro-2-nitro-benzene, 1-bromo-2-nitro-benzene or their derivatives may be used. The use of aromatic di-iodo compounds leads to terphenyls, as shown in following Reaction Scheme 6.

(6)

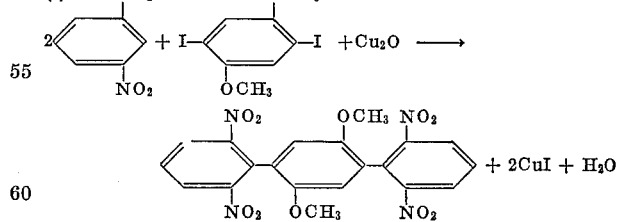

The nitro-biphenyls and nitro-terphenyls produced according to this method are important and valuable intermediates for the syntheses of amines, dyestuffs, pharmaceuticals, etc.

The following examples illustrate the invention.

EXAMPLE 1

2-nitro-2'-methoxy biphenyl

A mixture of 2-nitro-benzoic acid (8.2 g.), 1-iodo-2-methoxy benzene (11.7 g.), copper (I) oxide (4.5 g.) and quinoline (25 ml.) is refluxed for 15 minutes at 240° C. A violent reaction takes place, and water and carbon dioxide are evolved. The mixture is allowed to cool, approximately, 300 ml. of ether is added, and the precipitate formed, which contains, among other things, copper (I) iodide, is filtered off and washed with ether. The quinoline is removed from the filtrate by extraction with diluted hydrochloric acid, and the filtrate washed with water and dried. After the ether has been distilled off, an oil is obtained which on vacuum distillation gives 2-nitro-2'-methoxybiphenyl (5.1 g. 50% yield, melting point 80–83° C.).

EXAMPLE 2

2-nitro-4'-methoxy-biphenyl

The reaction of 2-nitro-benzoic acid anhydride (7.9 g.), 1-iodo-4-methoxy benzene (11.7 g.), copper (I) oxide (4.5 g.) in quinoline (25 ml.) for 15 minutes at 240° C., is carried out as in Example 1 to give 2-nitro-4'-methoxy biphenyl (32% yield, melting point 61–64° C.).

EXAMPLE 3

2,2'-dinitro-biphenyl

The reaction of 2-nitro-benzoic acid (8.2 g.), 2-chloro-nitro-benzene (8.7 g.) or 2-bromo-nitro-benzene (10.1 g.), copper (I) oxide (4.5 g.) in quinoline (25 ml.) for 15 minutes at 240° C. is carried out as in Example 1 to give 2,2'-dinitro biphenyl (30–35% yield, melting point 121–123° C.).

EXAMPLE 4

2,4-dinitro-biphenyl

Reaction of 2,4-dinitro-benzoic acid (11.4 g.), iodobenzene (10.2 g.), copper (I) oxide (4.5 g.) and quinoline (25 ml.) for 15 minutes is carried out as in Example 1 to give 2,4-dinitro-biphenyl (15% yield, melting point 107–110° C.) and small quantities of 2,6-dinitro-biphenyl.

EXAMPLE 5

2,6-dinitro-4'-methoxy-biphenyl

Reaction of 2,6-dinitro-benzoic acid (11.4 g.), 1-iodo-4-methoxy benzene (11.7 g.), copper (I) oxide (4.5 g.) and quinoline (125 ml.) for 12.5 minutes at 240° C. is carried out as in Example 1 to give 2,6-dinitro-4'-methoxy biphenyl (31% yield, melting point 113–116° C.).

EXAMPLE 6

2,6-dinitro-3',4'-dimethoxy-biphenyl

A mixture of 1,3-dinitro-benzene (8.4 g.), 1-iodo-3,4-dimethoxy-benzene (13.2 g.), copper (I) oxide (4.5 g.) and quinoline (125 ml.) is refluxed for 2 hours. After cooling, the mixture is treated as in Example 1 to give 2,6-dinitro-3',4'-dimethoxy-biphenyl (58%, melting point 130–131° C.).

EXAMPLE 7

2-nitro-2'-methoxy-biphenyl

A mixture of nitro-benzene (6.2 g.), 1-iodo-2-methoxy-benzene (11.7 g.), copper (I) oxide (4.5 g.) and quinoline is refluxed for 10 hours. After cooling, the mixture is treated as in Example 1, to give 2-nitro-2'-methoxy-biphenyl (6% yield, melting point 80–83° C.).

EXAMPLE 8

4-methoxy-2',4',6'-trinitro-biphenyl and 4,4''-dimethoxy 2',4',6'-trinitro-m-terphenyl A mixture of 1,3,5-trinitro-benzene (2.13 g.), 1-iodo-4-methoxy-benzene (7.02 g.), copper (I) oxide (3.24 g.) and quinoline (25 ml.) is kept at 180° C. for 2 hours, with constant stirring. After cooling, the mixture is treated as in Example 1, to give 4-methoxy-2',4',6'-trinitro-biphenyl (69%, melting point 143–144.5°) and 4,4''-dimethoxy-2',4',6'-trinitro-m-terphenyl (7%, melting point 237–240° C.). If the reaction is carried out at a higher temperature or for a longer time, the yield of terphenyl increases, while the yield of biphenyl decreases to a corresponding degree.

EXAMPLE 9

2',5'-dimethoxy-2,2'',6,6''-tetranitro-p-terphenyl

A mixture of 1,3-dinitro-benzene (3.36 g.), 1,4-di-iodo-2,5-dimethoxybenzene (3.90 g.), copper (I) oxide (215 g.) and quinoline (25 ml.) is refluxed for 5 hours. After cooling, the mixture is treated as in Example 1, to give the sparingly soluble 2',5'-dimethoxy-2,2'',6,6''-tetranitro-p-terphenyl (12%, melting point 341–343° C.).

We claim:
1. A method of producing nitro-biphenyls or nitro-terphenyls which comprises heating in quinoline an aromatic nitro compound selected from the group consisting of nitro-benzene, 1,3-dinitro-benzene, 1,3,5-trinitro-benzene, 2-nitro-benzoic acid, 2,4-dinitro-benzoic acid, 2,6-dinitro-benzoic acid, and the anhydrides of said acids, a halogen substituted benzene selected from the group consisting of iodobenzenes, nitro-chloro-benzenes, and nitro-bromo-benzenes, and copper (I) oxide.

2. A method according to claim 1, wherein the halogen substituted benzene is a monohalogen compound.

3. A method according to claim 2, wherein the monohalogen compound is a mono-iodo compound.

4. A method for producing nitro-terphenyls in accordance with claim 1, wherein the halogen substituted benzene is a di-halogen compound.

5. A method in accordance with claim 4, wherein the di-halogen compound is a di-iodo compound.

6. A method for producing nitro-m-terphenyls in accordance with claim 1, wherein the aromatic nitro compound is 1,3,5-trinitro-benzene.

7. A method in accordance with claim 6, wherein the halogen substituted benzene is a mono-iodo compound.

References Cited

Kornblum et al.: Jour. Amer. Chem. Soc., vol. 47 (1952), p. 5782.

Chem. and Eng. News (January 1961), pp. 46–47.

BERNARD HELFIN, *Primary Examiner*.